AMPLITUDE MODULATOR CIRCUIT

Filed June 28, 1954

INVENTORS
LODOVICUS FRANCISCUS DERT
ADRIANUS JOHANNES DE VRIES
BY
AGENT

United States Patent Office 2,805,396

Patented Sept. 3, 1957

2,805,396

AMPLITUDE MODULATOR CIRCUIT

Lodovicus Franciscus Dert and Adrianus Johannes de Vries, Hilversum, Netherlands, assignors, by mesne assignments, to North American Philips Company, Inc., New York, N. Y., a corporation of Delaware Application June 23, 1954, Serial No. 439,826

Claims priority, application Netherlands July 15, 1953

3 Claims. (Cl. 332—47)

This invention relates to amplitude modulator circuits comprising an input transformer and an output transformer and rectifying cells provided between the terminals of the secondary winding of the input transformer and the terminals of the primary winding of the output transformer, one input signal being supplied to centre tappings on the said transformer windings and the other being supplied to the primary winding of the input transformer.

Applicant has found that more particularly if such modulator circuits are used in transmission equipment designed for the transmission of signals having a comparatively large band-width and/or a high carrier-wave frequency, for example supergroup modulators in carrier-wave telephone systems, television transmitting devices, etc. the quality of the transmission decreases as a result of distortion in the transmitted signals, unwanted modulation products and the like.

According to the invention, the said disadvantages are substantially suppressed in a modulator circuit of the kind mentioned in the preamble in that the carrier-wave circuit of the modulator which comprises an inductance substantially originating from stray inductance of the transformer is tuned to the carrier-wave frequency with the use of a series-capacitor.

The invention and its advantages will now be explained with reference to the accompanying drawing, given by way of example, in which.

Figure 1:
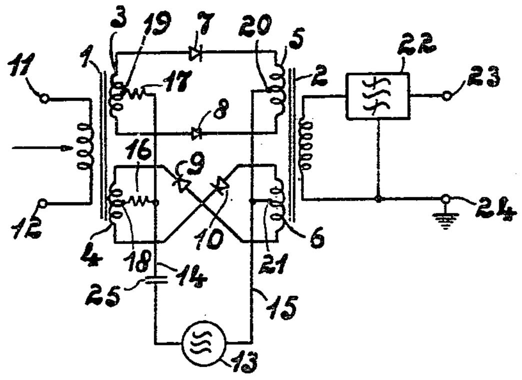
Fig. 1 shows an amplitude modulator circuit according to the invention.

The amplitude modulator circuit shown in Fig. 1 is intended for supergroup modulation in a carrier-wave telephone system in which the basis supergroup which serves as the modulating voltage exhibits a frequency range of from 312 to 552 kcs./s. and the frequency of the carrier-wave oscillation used is 612 kcs./s.

The amplitude modulator circuit as shown comprises an input transformer 1 and an output transformer 2 having relatively separate secondary windings 3, 4 and relatively separate primary windings 5, 6, the terminals of which are interconnected by rectifiers 7, 8, 9, 10 in the manner illustrated.

In this circuit the basis supergroup of 312 to 552 kcs./s., which serves as the modulating voltage, is applied to input terminals 11, 12 of the primary winding of input transformer 1, whilst the carrier-wave frequency provided by an oscillator 13 is applied by way of leads 14, 15 and series-resistors 16, 17 to the input terminals constituted by centre tappings 18, 19, 20, 21 on the said windings 3, 4 and 5, 6.

The lower side-band of 60 to 300 kcs./s. which is obtained in the amplitude modulator by modulation of the basis supergroup and the carrier-wave frequency is supplied by way of a single side-band filter 22 to output terminals 23, 24 for further use in the output equipment of the carrier-wave telephone system.

It appears that distortion, unwanted modulation products and the like occur in the output voltage of the circuit so far described, which, as has been found by applicant, are largely attributable to stray inductances of the transformers 1, 2, since these stray inductances are responsible for the fact that the carrier-wave oscillation occurs at the rectifiers 7, 8, 9, 10 with insufficient amplitude. The values of the stray inductances are intimately connected with the inductances of the transformer windings which, in the example under consideration, are required to be of sufficient value to permit a transmission of the whole of the basis supergroup which is faithful in amplitude.

According to the invention, in order to prevent the stray inductances from being affected in an interfering manner, the carrier-wave circuit of the modulator comprising an inductance substantially originating from stray inductance of the transformer is tuned by way of a series-capacitor 25 to the carrier-wave frequency, which series-capacitor in the circuit shown is included in the supply lead 14 for the carrier-waves.

It is thus ensured that the carrier-wave oscillation reaches the modulator rectifiers 7, 8, 9, 10 substantially without attenuation and this results in a material improvement in the signal-noise ratio. In a practical embodiment of the described circuit this improvement was, for example, 8 dbs. It is to be noted that the amplitude modulator circuit constitutes an ohmic load impedance for the oscillator 13.

The series-capacitor may naturally be divided over the two supply leads 14, 15 for the carrier waves.

Figure 2:
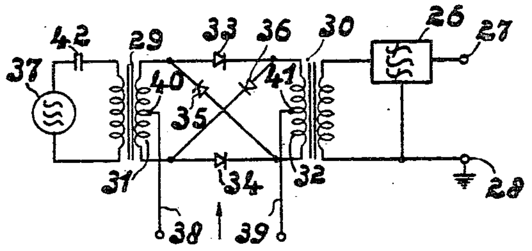
Fig. 2 shows a variant of the amplitude modulator circuit of Fig. 1.

The embodiment shown in Fig. 2 shows an amplitude modulator circuit intended for modulating television signals having a frequency range of from 0 to 5.5 mcs./s. on a carrier-wave frequency of 12.6 mcs./s. The lower side-band obtained by modulation and a small portion of the upper side-band which is located in the frequency range 7.1 to 13.1 mcs./s. are supplied by way of a band-pass filter 26 to output terminals 27, 28, which are connected, for example via a second modulator stage, to a coaxial transmission cable for downward transposition of the amplitude-modulated signals.

The modulator circuit shown comprises an input transformer 29 and an output transformer 30 and rectifying cells 33, 34, 35, 36 provided between the terminals of the secondary winding 31 of input transformer 29 and the terminals of the primary winding 32 of output transformer 30.

In this circuit the carrier-wave frequency provided by a carrier-wave oscillator 37 is supplied to input terminals of the primary winding of input transformer 29, the television signals being supplied by way of leads 38, 39 to the input terminals constituted by centre tappings 40, 41 on the said windings 31, 32.

In this circuit the interfering influence exerted by stray inductances of the transformers 29, 30 on the quality of the transmission is avoided by the use of a capacitor 42 which is connected in series with the primary winding of input transformer 29.

In television transmission the afore-mentioned step is particularly important, since the inductances of the transformer windings and hence the stray inductances are in this case higher than would be required only for a transmission which is faithful in amplitude, since it is also necessary to ensure that the television signals in the modulator circuit are not submitted to unwanted phase shifts.

Figure 3:
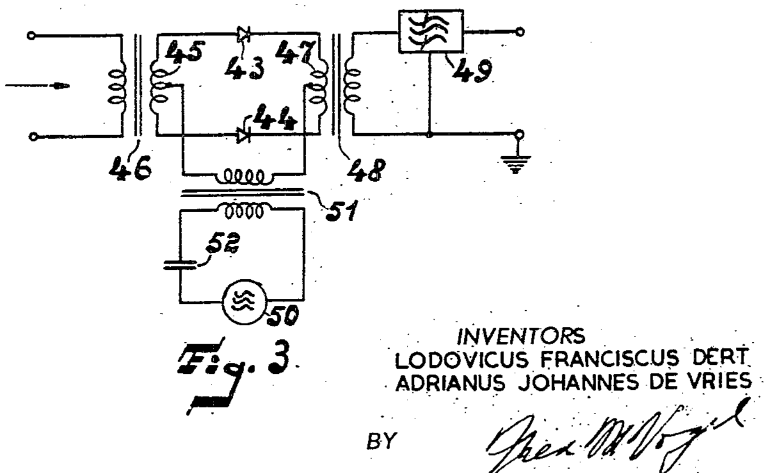
Fig. 3 shows another embodiment of a modulator circuit according to the invention.

It is noted here that the said step may also advantageously be taken in push-pull modulators, for example in the manner illustrated in Fig. 3. The push-pull modulator comprises two rectifiers 43, 44, which constitute the connection between the terminals of the secondary winding 45 of an input transformer 46 and the primary winding 47 of an output transformer 48, and an output filter 49 which is connected to the secondary winding of output transformer 48. In this circuit the modulator voltage is supplied to the primary winding of input transformer 46, a carrier-wave oscillator 50 being connected by way of a transformer 51 to centre tappings on the windings 45 and 47. In this case a series-capacitor 52 which serves to avoid the interfering influence of stray inductances in the carrier-wave circuit is connected in series with the primary winding of transformer 51.

What is claimed is:

1. An amplitude modulator circuit comprising an input transformer and an output transformer, rectifying cells connected between terminals of the secondary winding of said input transformer and terminals of the primary winding of said output transformer, a first source of input signals connected between center taps of said windings, a second source of input signals connected across the primary winding of said input transformer, one of said sources of input signals comprising a source of carrier waves, at least one of said transformers to which said source of carrier waves is connected having an inductive component of impedance, and a capacitor interposed in series with said source of carrier waves and having a value to form a circuit in cooperation with said inductive component which is tuned to the frequency of said carrier waves.

2. An amplitude modulator circuit as claimed in claim 1, in which said first source of input signals comprises said source of carrier waves.

3. An amplitude modulator circuit as claimed in claim 1, in which said second source of input signals comprises said source of carrier waves.

References Cited in the file of this patent

UNITED STATES PATENTS

| | | |
|---|---|---|
| 2,136,606 | Bendel | Nov. 15, 1938 |
| 2,227,027 | Schlesinger | Dec. 31, 1940 |